United States Patent
Krause et al.

(10) Patent No.: US 8,393,167 B2
(45) Date of Patent: *Mar. 12, 2013

(54) APPARATUS AND METHOD FOR IDENTIFYING A FILTER ASSEMBLY

(75) Inventors: Andrew Krause, Lagrange, KY (US); Ramesh Janardhanam, Pardeeville, WI (US); Steven Root, Buckner, KY (US); Abdel Hamad, Prospect, KY (US)

(73) Assignee: General Electric Company, Schenectady, NY (US)

( * ) Notice: Subject to any disclaimer, the term of this patent is extended or adjusted under 35 U.S.C. 154(b) by 289 days.

This patent is subject to a terminal disclaimer.

(21) Appl. No.: 12/903,310

(22) Filed: Oct. 13, 2010

(65) Prior Publication Data

US 2011/0036109 A1 Feb. 17, 2011

Related U.S. Application Data

(63) Continuation-in-part of application No. 11/518,133, filed on Sep. 8, 2006, now Pat. No. 7,836,708.

(51) Int. Cl.
- *F25B 49/00* (2006.01)
- *B01D 35/00* (2006.01)
- *B01D 21/30* (2006.01)

(52) U.S. Cl. ............................. 62/125; 210/85; 210/143

(58) Field of Classification Search .................. 62/125, 62/317; 210/85, 143

See application file for complete search history.

(56) References Cited

U.S. PATENT DOCUMENTS

| | | | | |
|---|---|---|---|---|
| 5,674,381 A | * | 10/1997 | Den Dekker | 210/85 |
| 5,868,925 A | * | 2/1999 | Turchetti | 210/86 |
| 6,051,144 A | * | 4/2000 | Clack et al. | 210/739 |
| 6,303,031 B1 | * | 10/2001 | Senner | 210/232 |
| 6,355,177 B2 | * | 3/2002 | Senner et al. | 210/739 |
| 6,491,811 B2 | * | 12/2002 | Conrad et al. | 210/85 |
| 6,551,503 B2 | * | 4/2003 | Niers et al. | 210/85 |
| 7,481,917 B2 | * | 1/2009 | Ikeyama et al. | 210/85 |
| 7,836,708 B2 | * | 11/2010 | Krause et al. | 62/125 |
| 8,084,259 B2 | * | 12/2011 | DiLeo | 436/3 |
| 8,118,997 B2 | * | 2/2012 | Ebrom et al. | 210/91 |
| 2001/0042707 A1 | * | 11/2001 | Niers et al. | 210/85 |
| 2002/0144937 A1 | * | 10/2002 | Wilberscheid et al. | 210/85 |
| 2002/0144938 A1 | * | 10/2002 | Hawkins et al. | 210/85 |
| 2003/0168389 A1 | * | 9/2003 | Astle et al. | 210/85 |
| 2006/0060512 A1 | * | 3/2006 | Astle et al. | 210/85 |
| 2007/0068190 A1 | * | 3/2007 | Venkatakrishnan et al. | 62/389 |

* cited by examiner

*Primary Examiner* — Ljiljana Ciric
*Assistant Examiner* — Alexis Cox
(74) *Attorney, Agent, or Firm* — Global Patent Operation

(57) ABSTRACT

A water dispensing system for a refrigerator comprising a refrigeration compartment includes a manifold assembly, a monitoring device coupled to the manifold assembly and including at least one sensor, and a filter assembly including a filter housing removably mounted to the manifold assembly. The filter assembly is configured to be compatible with a plurality of suitable filter media. At least two indicators are in signal communication with the at least one sensor when the filter housing is mounted onto the manifold assembly. A controller is operatively coupled to the monitoring device. The controller is configured to identify the filter assembly and the filter medium based on a signal received from the at least one sensor and operate the water dispensing system based on the identification of the filter assembly and the filter medium.

14 Claims, 6 Drawing Sheets

APPARATUS AND METHOD FOR IDENTIFYING A FILTER ASSEMBLY

CROSS REFERENCE TO RELATED APPLICATIONS

This application is a continuation-in-part of U.S. patent application Ser. No. 11/518,133 filed Sep. 8, 2006, now U.S. Pat. No. 7,836,708 which is hereby incorporated by reference in its entirety.

BACKGROUND OF THE INVENTION

This invention relates generally to water filter identification systems and, more particularly, to an apparatus and method for identifying a filter assembly for a refrigerator water dispensing system.

Several conventional refrigerators include water storage tanks for cooling and storing water to be dispensed. In one conventional water dispensing system, a serpentine water storage tank includes a water filter. Conventional water dispensing systems may include a water filter in fluid communication with a water storage tank located in a fresh food or freezer food compartment of the refrigerator.

The water filter is provided in the water dispensing system to remove undesired particles from the water. Different filters vary in filtering capacity and/or filtering functions. However, at least some water dispensing systems for conventional refrigerators are compatible only with one sized water filter. Therefore, the water filter cannot be changed to meet specific water quality and/or water capacity concerns of the customers, which may discourage some consumers from purchasing a refrigerator having such a water dispensing system.

BRIEF DESCRIPTION OF THE INVENTION

In one aspect, a water dispensing system for a refrigerator comprising a refrigeration compartment is provided. The water dispensing system includes a manifold assembly, a monitoring device coupled to the manifold assembly and including at least one sensor, and a filter assembly including a filter housing removably mounted to the manifold assembly. The filter assembly is configured to be compatible with any suitable filter medium. At least two indicators are in signal communication with the at least one sensor when the filter housing is mounted onto the manifold assembly. A controller is operatively coupled to the monitoring device. The controller is configured to identify the filter assembly and the filter medium based on a signal received from the at least one sensor and operate the water dispensing system based on the identification of the filter assembly and the filter medium.

In another aspect, refrigerator having a water dispensing system is provided. The refrigerator includes a manifold assembly, a monitoring device coupled to the manifold assembly and including at least one sensor, and a filter assembly configured to filter water through the water dispensing system and to be compatible with a plurality of suitable filter media. The filter assembly includes a filter housing removably mounted to the manifold assembly. The filter assembly further includes at least two indicators in signal communication with the at least one sensor when the filter housing is mounted onto the manifold assembly. A controller is in signal communication with the monitoring device. The controller is configured to identify the filter assembly and the filter medium based on a signal received from the at least one sensor and to operate the water dispensing system based on the identification of the filter assembly and the filter medium.

In still another aspect, a method for manufacturing a refrigerator including a water dispensing system is provided. The method includes positioning a manifold assembly with respect to a refrigeration compartment of the refrigerator. The manifold assembly is coupled to a monitoring device that includes at least one filter sensor in signal communication with a controller. A filter assembly is removably mounted to the manifold assembly. The filter assembly is configured to filter water channeled therethrough and to be compatible with a plurality of suitable filter media. The filter assembly includes a filter housing removably mounted to the manifold assembly and including a filter medium. The method further includes interfacing at least two filter indicators with the at least one filter sensor when the filter housing is mounted onto the manifold assembly, transmitting a signal from the at least one filter sensor to the controller upon interfacing with the at least two filter indicators, and identifying the filter assembly and the filter medium based on the transmitted signal. The water dispensing system is operated based on the identification of the filter assembly and the filter medium.

DETAILED DESCRIPTION OF THE INVENTION

As used herein, the phrase "with respect to" refers to being in relationship with or to, being in reference to another component, being based on another component. Further, as used herein, the term "interface," or variations thereof, refers to a meeting and/or interaction between at least two systems, subjects, and/or components. Systems, subjects, and/or components need no be in direct contact to interface.

Figure 1:
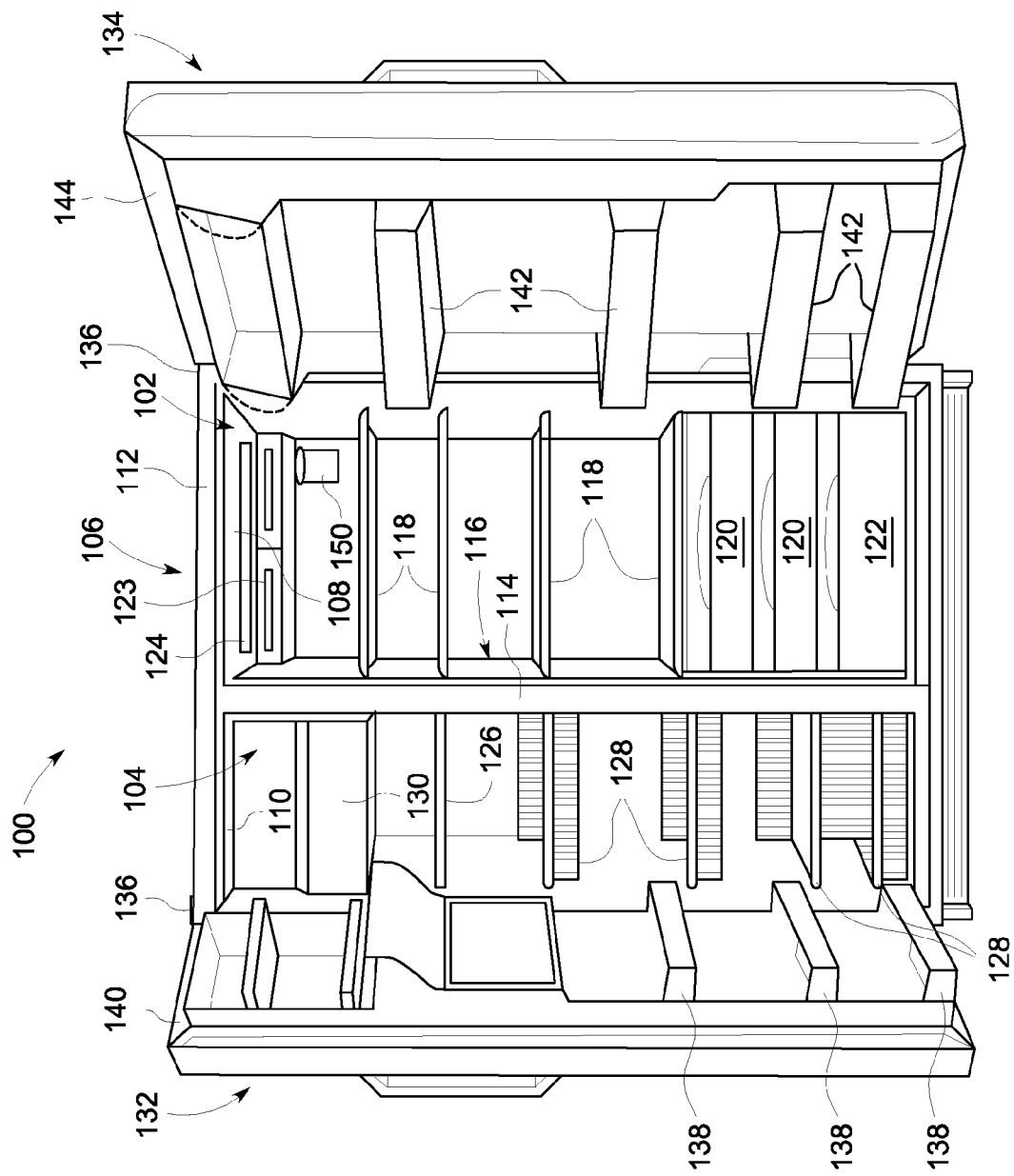
FIG. 1 is a perspective view of an exemplary refrigerator.

FIG. 1 is a perspective view of an exemplary refrigerator 100 in which exemplary embodiments of the present invention may be practiced and for which the benefits of the invention may be realized. It is apparent to those skilled in the art and guided by the teachings herein provided that the apparatus and/or method, as described herein, may likewise be practiced in any suitable refrigerator. Therefore, refrigerator 100 as described and illustrated herein is for illustrative purposes only and is not intended to limit the herein described apparatus and/or method in any aspect.

FIG. 1 illustrates a side-by-side refrigerator 100 including a fresh food storage compartment, or refrigeration compartment, 102 and a freezer storage compartment 104. Fresh food compartment 102 and freezer compartment 104 are arranged side-by-side. In one embodiment, refrigerator 100 is a commercially available refrigerator from General Electric Company, Appliance Park, Louisville, Ky. 40225, and is modified to incorporate the herein described apparatus. It is apparent to those skilled in the art and guided by the teachings herein provided that the present invention is suitable for incorporation into other types of refrigeration appliances including, without limitation top and bottom mount refrigerators.

Fresh food storage compartment 102 and freezer storage compartment 104 are contained within an outer case 106 having inner liners 108 and 110. A space between outer case 106 and inner liners 108 and 110, and between liners 108 and 110, is filled with insulation. In one embodiment, outer case 106 is formed by folding a sheet of a suitable material, such as pre-painted steel, into an inverted U-shape to form a top wall and side walls of outer case 106. In this embodiment, outer case 106 is formed separately and coupled to the side walls and a bottom frame that provides support for refrigerator 100. Inner liners 108 and 110 are molded from a suitable plastic material to form fresh food compartment 102 and freezer compartment 104, respectively. In an alternative embodiment, inner liners 108 and/or 110 are formed by bending and welding a sheet of a suitable metal, such as steel. The illustrative embodiment includes two separate inner liners 108 and 110, as refrigerator 100 is a relatively large capacity unit and separate liners add strength and are easier to maintain within manufacturing tolerances. In smaller refrigerators, a single liner is formed and a mullion spans between opposite sides of the liner to divide it into a freezer compartment and a fresh food compartment.

A breaker strip 112 extends between a case front flange and outer front edges of inner liners 108 and 110. Breaker strip 112 is formed from a suitable resilient material, such as an extruded acrylo-butadiene-styrene based material (commonly referred to as ABS).

The insulation in the space between inner liners 108 and 110 is covered by another strip of suitable resilient material, commonly referred to as a mullion 114. In this embodiment, mullion 114 is formed of an extruded ABS material. Breaker strip 112 and mullion 114 form a front face, and extend completely around inner peripheral edges of outer case 106 and vertically between inner liners 108 and 110. Mullion 114, the insulation between compartments, and a spaced wall of liners separating the compartments, may be collectively referred to herein as a center mullion wall 116.

Shelves 118 and slide-out drawers 120 normally are provided in fresh food compartment 102 to support items being stored therein. A bottom drawer or pan 122 may partly form a quick chill and thaw system (not shown), which is selectively controlled, together with other refrigerator features, by a controller 123. In one embodiment, controller 123 selectively controls refrigerator features according to user preference via manipulation of a control interface 124 mounted in an upper region of fresh food storage compartment 102 and coupled to controller 123. At least one shelf 126 and/or at least one wire basket 128 are also provided in freezer compartment 104.

Controller 123 is mounted within refrigerator 100 and is programmed to perform functions described herein. As used herein, the term "controller" is not limited to integrated circuits referred to in the art as a microprocessor, but broadly refers to computers, processors, microcontrollers, microcomputers, programmable logic controllers, application specific integrated circuits and/or other programmable circuits, and these terms are used interchangeably herein.

Freezer compartment 104 includes an automatic ice maker 130 including a dispenser 131 provided in freezer door 132 so that ice can be dispensed without opening freezer door 132. In one embodiment, ice maker 130 includes a number of electromechanical elements that manipulate a mold to shape ice as it freezes, a mechanism to remove or release frozen ice from the mold and a primary ice bucket for storage of ice produced in the mold. Periodically, the ice supply is replenished by ice maker 130 as ice is removed from the primary ice bucket. The storage capacity of the primary ice bucket is generally sufficient for normal use of refrigerator 100.

Figure 2:
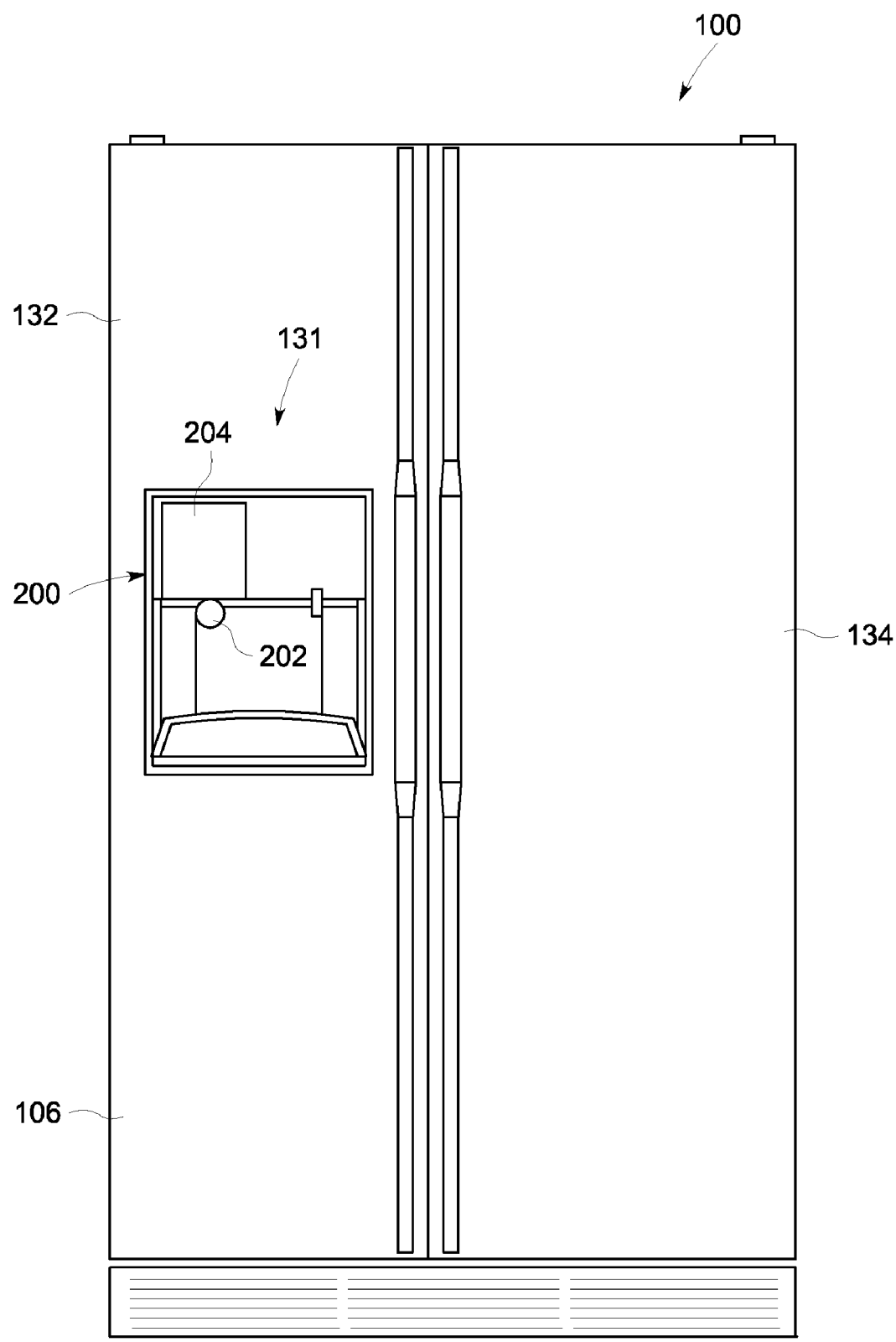
FIG. 2 is a front view of the refrigerator shown in FIG. 1.

Freezer door 132 and a fresh food door 134 close openings to freezer compartment 104 and fresh food compartment 102, respectively. Each door 132, 134 is mounted by a top hinge 136 and a cooperating bottom hinge (not shown) to rotate about an outer vertical edge between an open position, as shown in FIG. 1, and a closed position, as shown in FIG. 2. In one embodiment, freezer door 132 includes a plurality of storage shelves 138 and a sealing gasket 140. Similarly, fresh food door 134 includes a plurality of storage shelves 142 and a sealing gasket 144.

Refrigerator 100 includes a machinery compartment (not shown) that at least partially contains components for executing a known vapor compression cycle for cooling air. The components include a compressor, a condenser, an expansion device, and an evaporator connected in series and charged with a refrigerant. The evaporator is a type of heat exchanger that transfers heat from air passing over the evaporator to a refrigerant flowing through the evaporator, thereby causing the refrigerant to vaporize. The cooled air is used to refrigerate one or more refrigerator or freezer compartments via fans (not shown). Collectively, the vapor compression cycle components in a refrigeration circuit, associated fans and associated compartments are referred to herein as a "sealed system." The construction of the sealed system is well known and therefore not described in detail herein. The sealed system is operable to force cold air through the refrigerator.

Figure 5:
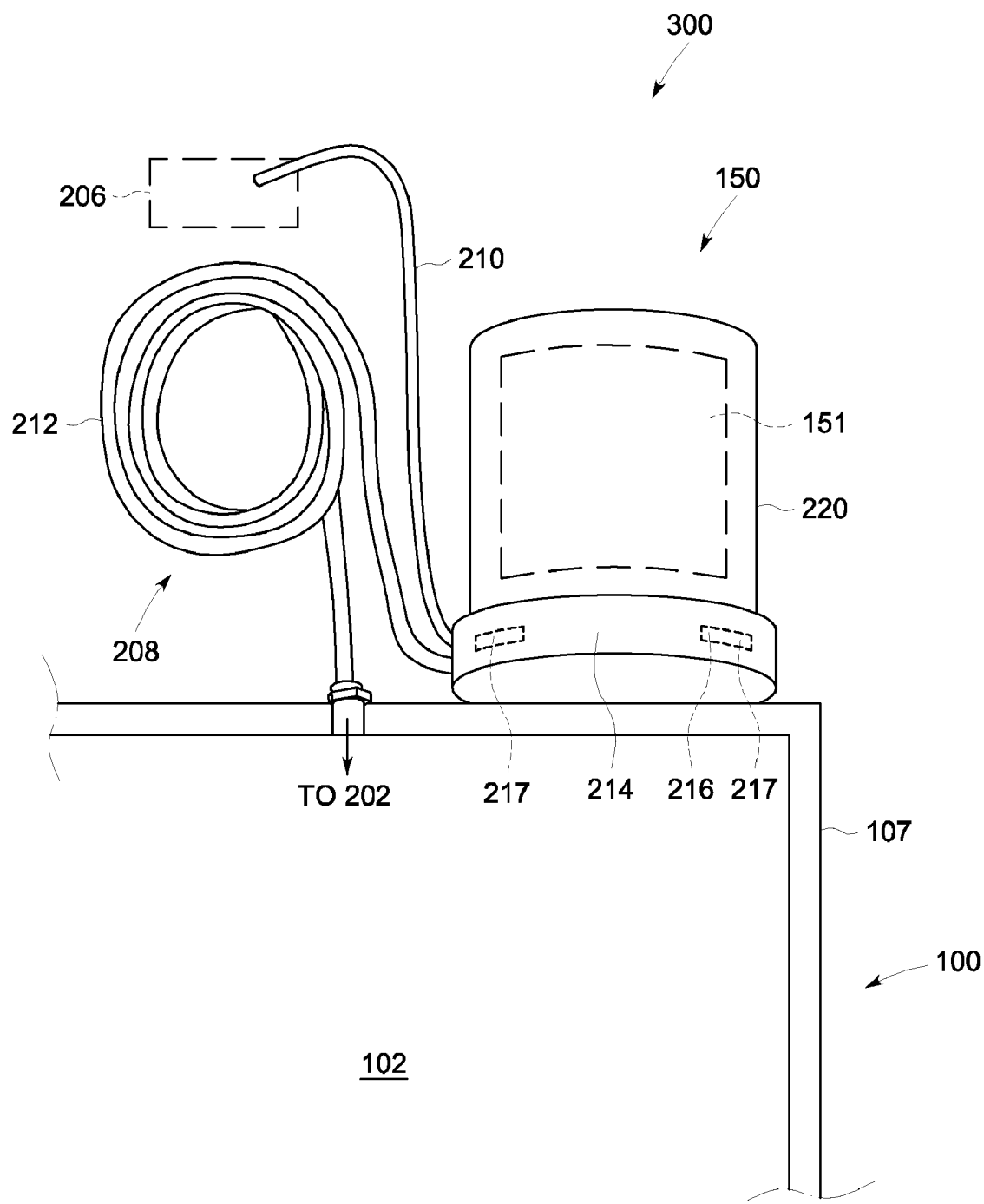
FIG. 5 is a schematic view of an alternative water dispensing system suitable for use with the refrigerator shown in FIG. 1.

In one embodiment, refrigerator 100 includes a water dispensing system 200 having a filter assembly 150, as described in more detail herein. In the exemplary embodiment, filter assembly 150 is mounted within fresh food compartment 102. In alternative embodiments, filter assembly 150 is mounted with respect to any suitable location within or outside of refrigerator 100. For example, as shown in FIG. 5, filter assembly 150 is mounted external to storage compartments 102 and/or 104 and/or outer case 106. In the exemplary embodiment, filter assembly 150 includes a filter medium 151 configured to remove particles from water channeled therethrough. Filter assembly 150 may include any suitable filter medium 151 to address different water quality and/or water capacity concerns of the consumers. In this embodiment, filter assembly 150 is compatible with a plurality of suitable filter media 151 and provides the ability to use interchangeable filter media 151 with the water dispensing system described below.

In one embodiment, water dispensing system 200 is partially mounted on freezer door 132. In this embodiment, water dispensing system 200 includes a water dispenser 202 extending through freezer door 132 and a user interface 204 mounted on the front face of freezer door 132. It is apparent to those skilled in the art and guided by the teachings herein provided that water dispensing system 200 may be mounted at any suitable location on refrigerator 100.

Figure 3:
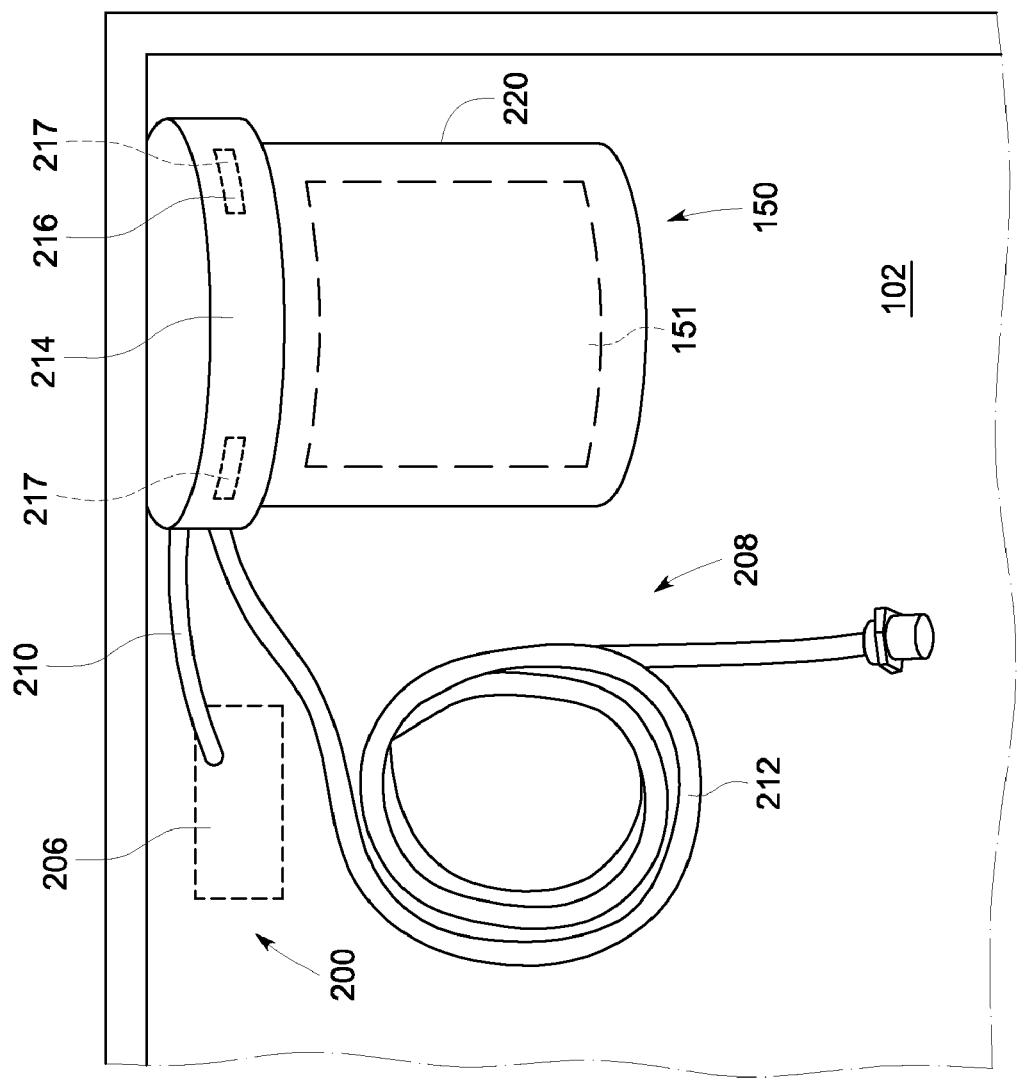
FIG. 3 is a schematic view of an exemplary water dispensing system suitable for use with the refrigerator shown in FIG. 1.

FIG. 3 is a schematic view of exemplary water dispensing system 200 suitable for incorporation into refrigerator 100 as shown in FIG. 1. Water dispensing system 200 includes water dispenser 202, user interface 204, a water tank 206, a manifold assembly 208, a filter support 214, and filter assembly 150. Controller 123 is also considered to be a component of water dispensing system 200. Water tank 206 is positioned within fresh food compartment 102 and/or within case 106. Water tank 206 is configured to store and/or cool water received from an external water source. Further, water tank 206 is in fluid communication with filter assembly 150.

In one embodiment, a manifold assembly 208 is positioned within fresh food compartment 102 and is coupled in flow communication with water dispensing system 200. As shown in FIG. 3, manifold assembly 208 includes an inlet line 210 coupled in flow communication with water tank 206 and an outlet line 212 coupled in flow communication with dispenser 202, as shown in FIG. 2. Manifold assembly 208 is coupled to filter support 214. Filter support 214 includes a monitoring device 216 including at least one sensor 217, such as a reed switch. In one embodiment, a plurality of sensors 217 are coupled to filter support 214 for facilitating detecting a filter assembly mounted to manifold assembly 208. In one embodiment, monitoring device 216 includes a plurality of sensors 217, such as reed switches, that are electronically coupled in signal communication with controller 123, shown in FIG. 1. Controller 123 receives a signal from monitoring device 216 and/or at least one sensor 217 and identifies the type of filter medium 151 within filter assembly 150 based on the signal received from monitoring device 216. It is apparent to those skilled in the art and guided by the teachings herein provided that any suitable number of sensors 217 may be incorporated into manifold assembly 208 for facilitating detecting filter medium 151 operatively coupled to manifold assembly 208.

In one embodiment, filter assembly 150 is removably mounted on filter support 214 for filtering water. Filter assembly 150 includes a cylindrical filter housing 220 defining a chamber within which filter medium 151 is positioned. Filter medium 151 facilitates filtering water channeled through filter assembly 150. In one embodiment, different types of filter assemblies 150 with different filter medium 151 are interchangeably mounted to filter support 214. In one embodiment, filter assemblies 150 with different filtering functions and/or characteristics, such as particle filtering, taste and odor removal filtering and/or lead and mercury removal filtering, may be selected by the consumer and mounted onto filter support 214. In an alternative embodiment, filter assemblies 150 with different filtering capacities, such as different total flow until replacement values and/or different flow rate through filter values, are mounted onto filter support 214. As such, different types of filter assemblies 150 may be used to address specific water quality concerns of the consumer.

Figure 4:
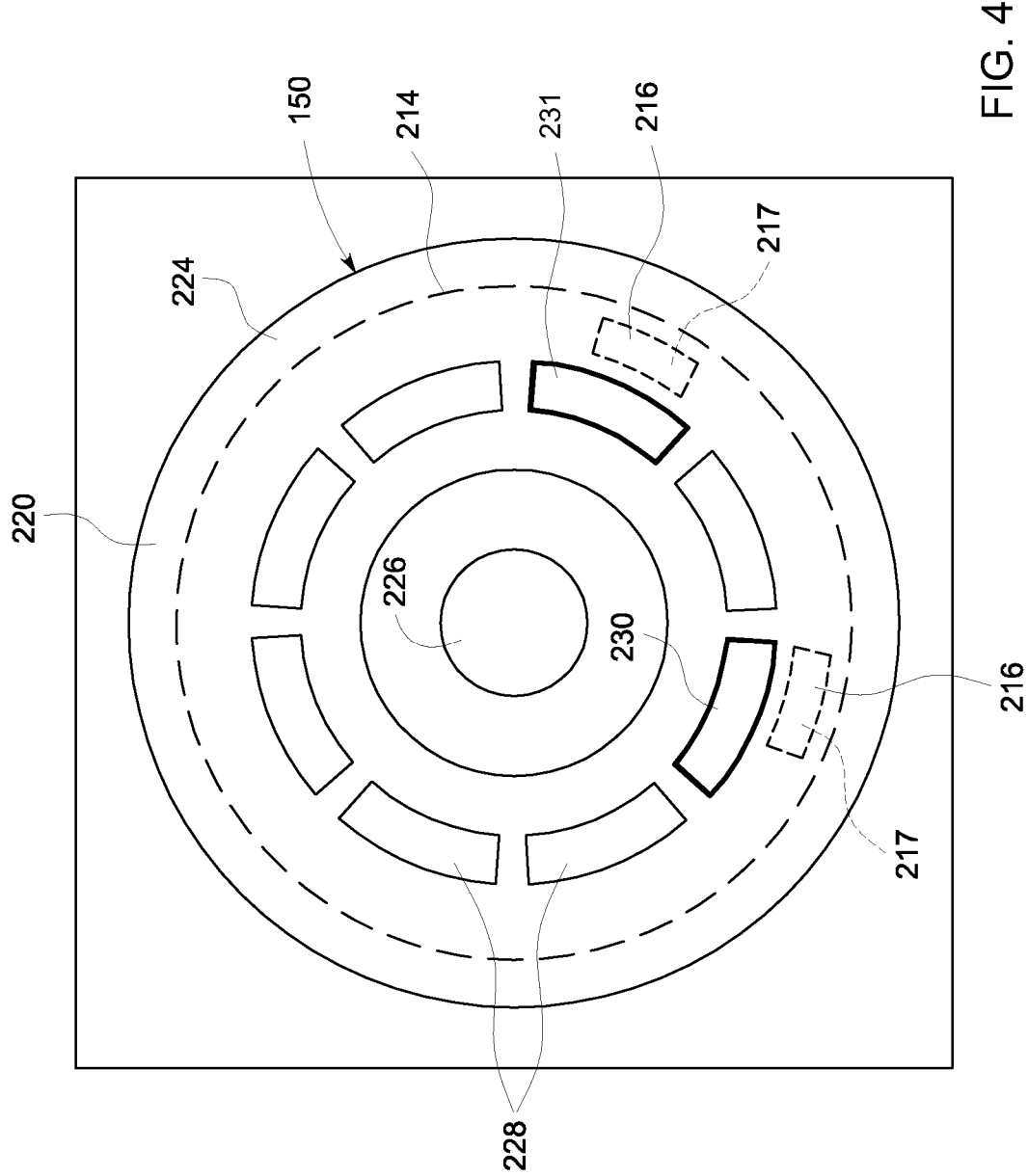
FIG. 4 is a top plan view of an exemplary filter assembly suitable for use with the water dispensing system shown in FIG. 3.

FIG. 4 is a top plan view of exemplary filter assembly 150 suitable for use with water dispensing system 200. Filter housing 220 includes an interface surface 224 for coupling to filter support 214. Filter housing 220 defines a central void 226 through interface surface 224 and a plurality of cavities 228 within interface surface 224. As shown in FIG. 4, cavities 228 circumferentially surround central void 226. In one embodiment, cavities 228 are substantially identical in shape and are spaced with respect to each other at an equal distance about central void 226.

In one embodiment, filter assembly 150 includes at least one indicator 230 and/or 231 coupled to filter housing 220. In a particular embodiment, each indicator 230 and/or 231 is selectively received in a corresponding cavity 228. In the embodiment shown in FIG. 4, filter assembly 150 includes at least two indicators 230 and 231 respectively received in a corresponding cavity 228 and arranged radially about central void 226. In an alternative embodiment, filter assembly 150 includes only one indicator 230 or 231 positioned in a corresponding cavity 228. Any suitable number of indicators 230 and/or 231 positioned at one or more cavities 228 identify different types of filter assemblies 150. For example, two indicators 230 and 231 can distinguish and identify four types of filter assemblies 150. In a further embodiment, each indicator 230 and/or 231 is a magnet for communicating with the corresponding monitoring device 216. It is apparent to those skilled in the art and guided by the teachings herein provided that any suitable number of indicators 230 and/or 231 may be employed for facilitating identification of the filter assembly.

During operation of water dispensing system 200, unfiltered water is channeled from water tank 206 into filter assembly 150 mounted on filter support 214 through inlet line 210. Filter assembly 150 and, more specifically, filter medium 151, removes undesirable elements and/or particles from the water channeled therethrough for improving the water quality. The filtered water then flows from filter assembly 150 into water dispenser 202 positioned on freezer door 132 through outlet line 212. Water is cooled as the water is channeled through inlet line 210 and/or outlet line 212 of manifold assembly 208. The cooled, filtered water is channeled outside refrigerator 100 when the consumer operates user interface 204.

When filter assembly 150 is mounted onto filter support 214, each indicator 230 and 231 interfaces with monitoring device 216 at, for example, a corresponding sensor 217. In the exemplary embodiment, indicator 230 is positioned adjacent monitoring device 216 when filter assembly 150 is mounted onto filter support 214. In one embodiment, each monitoring device 216 includes a sensor 217, such as a reed switch, and each indicator 230 and 231 includes a magnet. Each sensor 217 communicates with the corresponding magnet. With the magnet of indicator 230 and/or 231 positioned within cavity 228, two contacts (not shown) within the corresponding sensor 217 are attracted to each other and allow an electrical current to pass through sensor 217. Sensor 217 then detects the existence of the magnet based on the electrical current flowing therethrough. A signal is transmitted from one or more sensors 217 to controller 123 for facilitating identifying the type of filter assembly 150 positioned within manifold assembly 208.

As described above, at least one indicator 230 and/or 231 is selectively positioned in a corresponding cavity 228 for indicating a selected type of filter assembly 150. In one embodiment, "1" indicates that there is an electrical current through the corresponding sensor 217, and "0" indicates that there is no electrical current therethrough. Based on the signals received from the two sensors 217, as shown in FIG. 4, different types of filter assemblies 150 may be identified by controller 123 as "00", "01", "11" and "10". In one embodiment, "00", "01", "11", and "10" each correspond to a selected type of filter assembly 150. As such, controller 123 detects and/or identifies the type of filter assembly 150 based on the signals received from sensors 217.

In a further embodiment, controller 123 determines the filtering functions and/or filtering capacities based on the identified filter type. Controller 123 also operates water dispensing system 200 based upon the identification of filter assembly 150. Controller 123 channels water through filter assembly 150 upon the identification of filter assembly 150. Controller 123 may also determine the working condition and/or life expectancy of filter assembly 150 based on the determined filtering capacities. In alternative embodiments, any suitable number of indicators 230 are employed for facilitating identifying any suitable corresponding number of filter assemblies and/or filters. Further, in the alternative embodiments, any suitable number of sensors corresponding to the number of indicators are provided for cooperating with the indicators to identify the filter assemblies and/or filters.

FIG. 5 is a schematic view of an alternative water dispensing system 300 suitable for use with refrigerator 100 (shown in FIG. 1). More specifically, water dispensing system 300 is substantially similar to water dispensing system 200 (shown in FIGS. 3 and 4), except components of water dispensing system 300 are positioned substantially outside of compartment 102, rather than within compartment 102. As such, components shown in FIG. 5 are labeled with the same reference numbers used in FIGS. 1-4.

More specifically, in the exemplary embodiment, filter assembly 150 is positioned outside of compartment 102. For example, depending on the embodiment, filter assembly 150 is positioned below a bottom wall of outer case 106, above a top wall of outer case 106, outside a side wall of outer case 106, and/or behind a back wall of outer case 106. In the exemplary embodiment, filter support 214 is coupled to an external surface 107 of outer case 106, and filter assembly 150 is coupled to filter support 214.

As such, monitoring device 216, including sensor 217, is located external to case 106. Manifold assembly 208 is also positioned outside of case 106. More specifically, inlet line 210 and/or outlet line 212 are positioned external of case 106. In a particular embodiment line 210 and/or line 212 extends along external surface 107 of outer case 106. Outlet line 212 is coupled in flow communication with water dispenser 202 along any suitable path, inside and/or outside of case 106.

Although manifold assembly 208, filter support 214, and filter assembly 150 are described as being positioned outside of case 106, it should be understood that manifold assembly 208, filter support 214, and/or filter assembly 150 can be at any suitable location outside of compartment 102 and/or compartment 104. Further, although manifold assembly 208, filter support 214, and filter assembly 150 are described as being positioned outside of case 106, it should be understood that manifold assembly 208, filter support 214, and/or filter assembly 150 can be at least partially positioned within compartment 102, compartment 104, and/or case 106.

Water dispensing system 300 enables a user to access filter assembly 150 without opening compartment 102 and/or compartment 104. As such, compartments 102 and/or 104 remain at a substantially constant temperature while filter assembly 150 is being accessed. Further, the positioning of filter assembly 150 external of case 106 enables the user to access filter assembly 150 without re-positioning contents of compartments 102 and/or 104. Moreover, because filter assembly 150, filter support 214, and manifold assembly 208 are outside of compartment 102 and/or 104, filter assembly 150, filter support 214, and manifold assembly 208 operate at room temperature, rather than refrigeration and/or freezer temperatures. Accordingly, filter assembly 150, filter support 214, and manifold assembly 208 need not be formed from as robust materials as filter assemblies, filter supports, and manifold assemblies positioned within refrigeration and/or freezer compartments. As such, water dispensing system 300 may be less expensive to manufacture than water dispensing systems having components configured to withstand temperatures below about 40 degrees Fahrenheit (° F.) and/or about 4 degrees Celsius (° C.).

Figure 6:
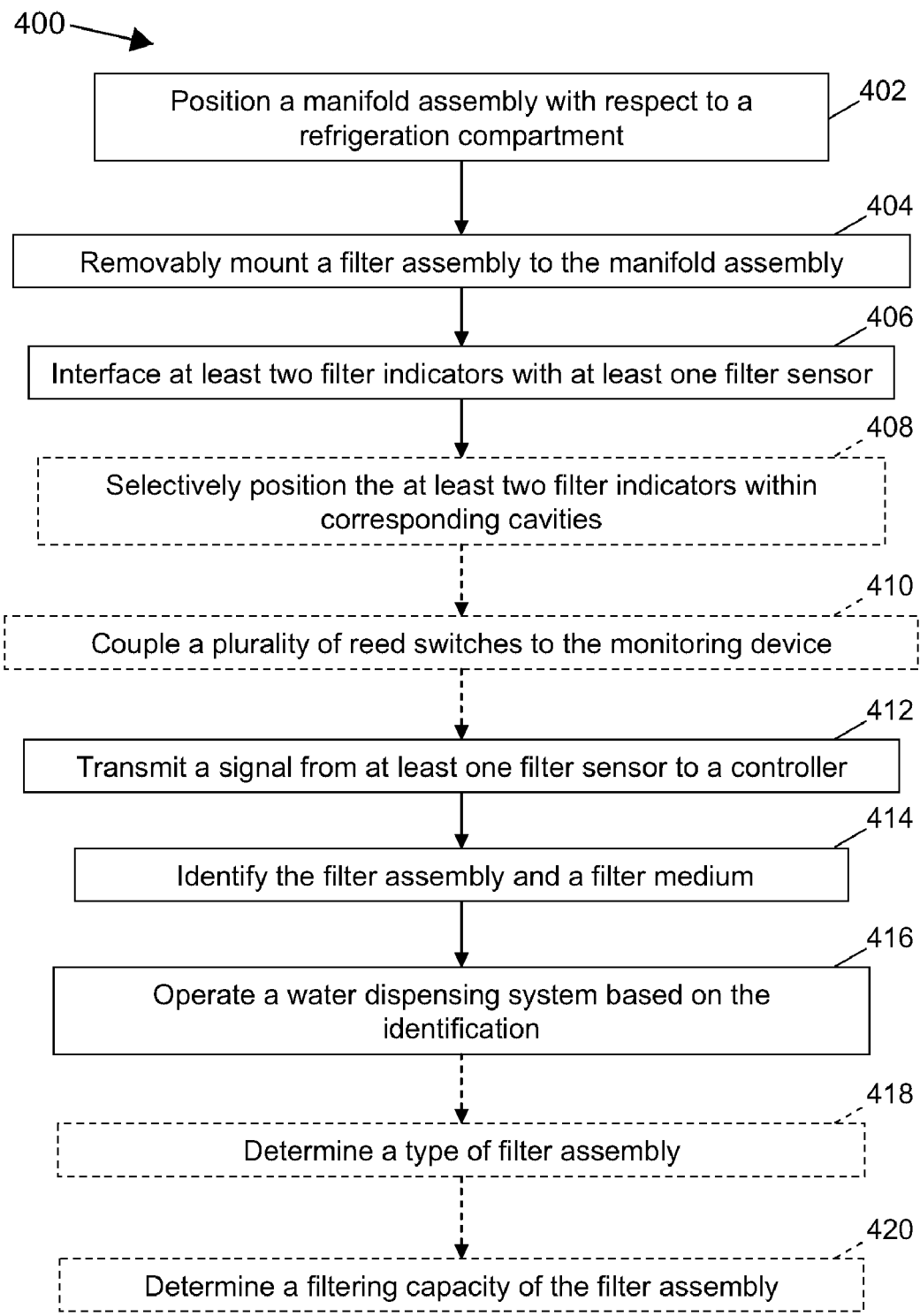
FIG. 6 is a flowchart of an exemplary method for identifying a filter assembly of the refrigerator shown in FIGS. 1-5.

FIG. 6 is a flowchart illustrating an exemplary method 400 for identifying a filter assembly of refrigerator 100 (shown in FIGS. 1-5). Referring to FIGS. 1-6, manifold assembly 208 is positioned 402 with respect to refrigeration compartment 102 of refrigerator 100. In the embodiment shown in FIG. 3, manifold assembly 208 is positioned 402 within refrigeration compartment 102, and, in the embodiment shown in FIG. 5, manifold assembly 208 is positioned 402 outside of refrigeration compartment 102. Although two examples of manifold assembly positioning are shown and described herein, it should be understood that manifold assembly 208 is positioned 402 at any suitable location with respect to refrigeration compartment 102.

Referring again to FIGS. 1-6, in the exemplary embodiment, filter assembly 150 is removably mounted 404 to manifold assembly 208. When filter assembly 150 is mounted 404 onto manifold assembly 208, at least two filter indicators 230 and 231 interface 406 with at least one filter sensor 217. In alternatively embodiments, more or less than two filter indicators 230 and/or 231 interface 406 with more or less than one filter sensor 217. In the exemplary embodiment, at least two filter indicators 230 and 231 are selectively positioned 408 within a corresponding cavity 228 such that filter indicators 230 and 231 circumferentially surround central void 226. The positions of filter indicators 230 and/or 231 within corresponding cavities 228 indicate a type of filter assembly 150. Further, in one embodiment, a plurality of reed switches are coupled 410 to monitoring device 216 as sensors 217. The plurality of reed switches are configured to detect at least two filter indicators 230 and/or 231.

In the exemplary embodiment, method 400 further includes transmitting 412 a signal from at least one filter sensor 217 to controller 123 upon interfacing 406 with at least two filter indicators 230 and 231. Filter assembly 150 and filter medium 151 are identified 414 based on the transmitted signal, and water dispensing system 200 is operated 416 based on the identification of filter assembly 150 and filter medium 151. In one embodiment, a type of filter assembly 150 is determined 418 based on the transmitted signal and/or a filtering capacity of filter assembly 150 is determined 420 based on the transmitted signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A water dispensing system for a refrigerator including a refrigeration compartment, said water dispensing system comprising:
   a manifold assembly;
   a monitoring device coupled to said manifold assembly and comprising at least one sensor;
   a filter assembly comprising a filter housing removably mounted to said manifold assembly, said filter assembly configured to be compatible with a plurality of suitable filter media;
   at least two indicators coupled with the filter housing and positioned to be in signal communication with said at least one sensor when said filter housing is mounted onto said manifold assembly; and
   a controller operatively coupled to said monitoring device, said controller configured to:
      identify said filter assembly and a filter medium of the plurality of suitable filter media based on a signal received from said at least one sensor; and
      operate said water dispensing system based on the identification of said filter assembly and said filter medium.

2. The water dispensing system in accordance with claim 1 wherein said filter assembly is positioned substantially outside of the refrigeration compartment.

3. The water dispensing system in accordance with claim 1 wherein data within the received signal comprises location information of said at least two indicators and a presence of an electrical current within each of said at least two indicators.

4. The water dispensing system in accordance with claim 1 wherein said filter housing defines a plurality of cavities within an interface surface of said filter housing and comprises said at least two indicators selectively positioned within a corresponding cavity of said plurality of cavities, said interface surface defining a central void, said plurality of cavities and said at least two indicators circumferentially surrounding said central void.

5. The water dispensing system in accordance with claim 4 wherein said at least two indicators comprise a plurality of magnets arranged radially about said central void of said filter housing.

6. The water dispensing system in accordance with claim 1 wherein said monitoring device further comprises at least two reed switches configured to detect said at least two indicators.

7. A refrigerator having a water dispensing system, said refrigerator comprising:
- a manifold assembly;
- a monitoring device coupled to said manifold assembly and comprising at least one sensor;
- a filter assembly configured to filter water through the water dispensing system and to be compatible with a plurality of suitable filter media,
- said filter assembly comprising a filter housing removably mounted to said manifold assembly,
- said filter assembly further comprising at least two indicators coupled with the filter housing and positioned to be in signal communication with said at least one sensor when said filter housing is mounted onto said manifold assembly; and
- a controller in signal communication with said monitoring device, said controller configured to:
  - identify said filter assembly and a filter medium of the plurality of suitable filter media based on a signal received from said at least one sensor; and
  - operate the water dispensing system based on the identification of said filter assembly and the filter medium.

8. The refrigerator in accordance with claim 7 further comprising a refrigeration compartment, said filter assembly positioned substantially outside of said refrigeration compartment.

9. The refrigerator in accordance with claim 7 wherein said at least two indicators each comprises a magnet.

10. The refrigerator in accordance with claim 7 wherein said monitoring device is configured to detect said at least two indicators.

11. The refrigerator in accordance with claim 7 wherein said monitoring device comprises at least one reed switch.

12. The refrigerator in accordance with claim 7 wherein said filter housing defines a plurality of cavities within an interface surface of said filter housing and comprises said at least two indicators selectively positioned within a corresponding cavity of said plurality of cavities, said interface surface defining a central void, and said plurality of cavities and said at least two indicators circumferentially surrounding said central void.

13. The refrigerator in accordance with claim 7 wherein said controller is further configured to determine a filtering capacity of said filter assembly based on the received signal.

14. The refrigerator in accordance with claim 7 wherein data within the received signal comprises location information of said at least two indicators and a presence of an electrical current within each of said at least two indicators.

* * * * *